United States Patent [19]

Hughes et al.

[11] Patent Number: 5,692,044

[45] Date of Patent: Nov. 25, 1997

[54] TELEPHONE HANDSET WITH ROCKER SWITCH DIRECTLY MOUNTED TO A CIRCUIT BOARD

[75] Inventors: John Nevil Hughes, Woking; Robert Clifford Newstead, Frimley, both of United Kingdom

[73] Assignee: Nokia Mobile Phones Limited, Espoo, Finland

[21] Appl. No.: 360,371

[22] Filed: Dec. 21, 1994

[30] Foreign Application Priority Data

Dec. 22, 1993 [GB] United Kingdom ............... 9326229

[51] Int. Cl.$^6$ ........................... H04M 1/02; H04M 1/60
[52] U.S. Cl. ................... 379/422; 379/142; 379/390; 200/339; 200/553; 361/781
[58] Field of Search ........................ 379/368, 395, 379/390, 441, 142, 447, 422; 200/368, 339, 553; 361/748, 780, 781

[56] References Cited

U.S. PATENT DOCUMENTS

| Re. 33,309 | 8/1990 | Walker, Jr. et al. | 379/395 |
|---|---|---|---|
| 4,179,593 | 12/1979 | Tsunefuji | 200/553 |
| 4,395,610 | 7/1983 | Downs et al. | 200/292 |
| 4,425,487 | 1/1984 | Hsieh | 200/557 |
| 4,654,488 | 3/1987 | Westfall | 200/5 R |
| 4,845,772 | 7/1989 | Metroka et al. | 379/61 |
| 5,436,954 | 7/1995 | Nishiyama et al. | 379/58 |

FOREIGN PATENT DOCUMENTS

| 0463856 | 1/1992 | European Pat. Off. |
| 0518274 | 12/1992 | European Pat. Off. |

Primary Examiner—Krista M. Zele
Assistant Examiner—Scott Wolinsky
Attorney, Agent, or Firm—Perman & Green, LLP

[57] ABSTRACT

A telephone handset having a housing, a loudspeaker, and microphone arranged to be brought into operating proximity with a user. A rocker member (41) extends through a side surface (16) of the housing and is arranged to be resiliently pushable in a first direction (46) and resiliently pushable in a second direction (47). A first switch (26) and a second switch (27) are mounted to a circuit board (25) in the housing; each arranged to cooperate with the rocker member so that the first switch is activated when the rocker member is pushed in the first direction and the second switch is activated when the rocker member is pushed in the second direction. The rocker member itself pivots about a pivot (31) directly mounted to the circuit board. Connection of the rocker member on the pivot directly on the circuit board facilitates fabrication of the circuit board into the housing without the constraint of ensuring, at this stage, that the rocker member co-operates with the switches mounted to the circuit board.

25 Claims, 2 Drawing Sheets

TELEPHONE HANDSET WITH ROCKER SWITCH DIRECTLY MOUNTED TO A CIRCUIT BOARD

BACKGROUND OF THE INVENTION

This invention relates to a telephone handset having a rocker member extending through a side surface of the handset.

Telephone handsets are known which include thumb operable switches. In Cellular telephones, for example, a pair of thumb operable switches may be provided wherein a first of said switches allows a parameter to be adjusted in a first sense, while the other of said switches allows said parameter to be operated in the opposite sense. Thus, subject to suitable selections being made from the front panel of the telephone, said switches may be used to modify a plurality of parameters, such as the output volume of the device or the memory address for stored telephone numbers etc.

Electronic components within the telephone handset are usually mounted onto a circuit board and said switches are also mounted onto said circuit board.

In known telephones, each switch has a respective co-operating member which extends through a side face of the telephone handset. In this way, each of said switches may be independently operated by an operator's thumb. Thus, the operator is required to position a thumb over the required button so as to effect the required adjustment.

In an alternative embodiment, a single rocker switch is provided which in turn co-operates with each of the buttons mounted on the circuit board. In this way, an operator is only required to position a thumb over the rocker switch and it is not necessary to move the thumb between two switches, thereby facilitating parameter adjustment. In these known devices, the rocker switch itself is pivoted on pivots mounted to the housing body and a problem with this arrangement is that the circuit board must be accurately mounted within the housing so that the rocker switch, mounted to the housing, accurately co-operates with the switches mounted to the circuit board. Thus, accurate machine tolerances are required, which in itself becomes more of a problem as telephone handsets are become smaller and smaller.

SUMMARY OF THE INVENTION

According to the present invention, there is provided a telephone handset comprising a housing having a front surface, arranged to be brought into operating proximity, and side surfaces; a rocker member extending through a side surface of said housing and arranged to be resiliently pushable in a first direction and resiliently pushable in a second direction; a first switch mounted to said circuit board and co-operating with said rocker member so that said switch is activated when said rocker member is manually pushed in said first direction; a second switch mounted to said circuit board and co-operating with said rocker member so that said switch is activated when said rocker member is manually pushed in said second direction; wherein said rocker member pivots, when manually pushed, about a pivot mounted to said circuit board.

Thus, an advantage of the present invention is that the rocker member, manually operated by an operator's thumb, is mounted to the circuit board and merely extends through a hole in a side face of the housing. In this way, the pivot for the rocker member is fabricated onto the circuit board as part of the overall circuit board fabrication process, facilitating the positioning of said pivot to a high degree of accuracy. However, it is no longer necessary to maintain this high level of accuracy when the circuit board is being assembled within the telephone housing itself. Thus, it is possible to perform the assembly process of placing the circuit board within the housing to a much less restrictive level of accuracy while at the same time ensuring that the manually operable rocker member accurately co-operates with the switches mounted on the circuit board.

In a preferred embodiment, the rocker is securely mounted to said pivot by a securing means, such as rivet or a screw.

In a preferred embodiment, said switches are used to control a parameter wherein operation of said first switch adjusts said parameter in a first sense and operation of said second switch adjusts said parameter in a second sense. Preferably, given that the telephone handset will include a loudspeaker, said parameter is the volume of an output signal supplied to said loudspeaker. Alternatively, the telephone may include a memory for storing telephone numbers and said parameter is the address of telephone numbers stored in said memory.

BRIEF DESCRIPTION OF THE DRAWINGS

The invention will now be described by way of example only, with reference to the accompanying drawings, in which.

DETAILED DESCRIPTION OF THE INVENTION

Figure 1:
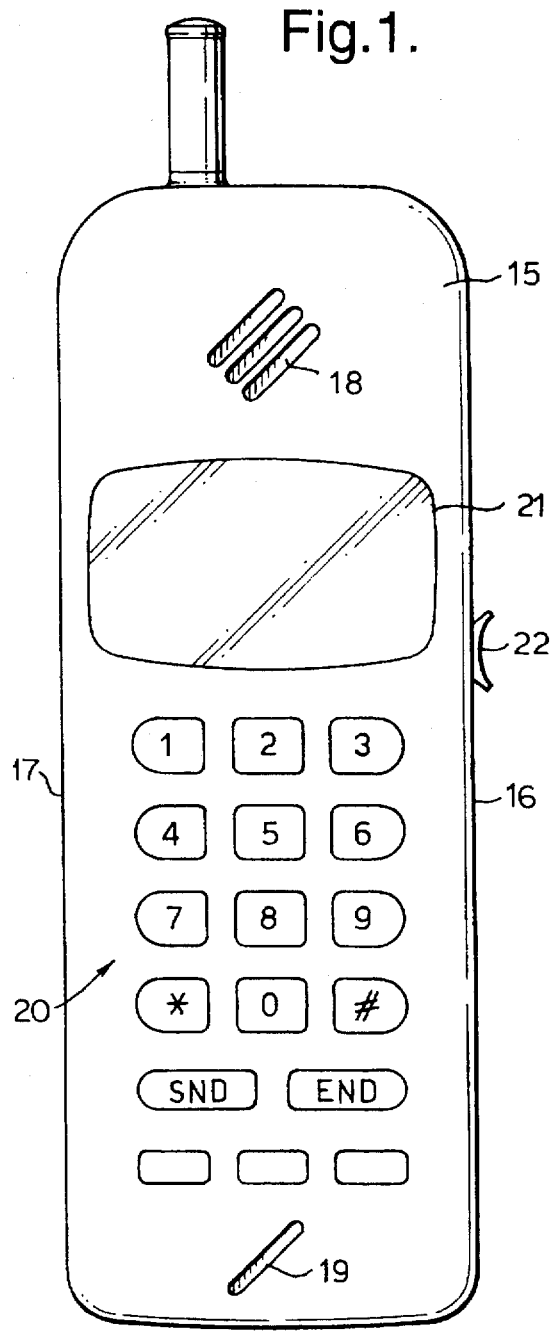
FIG. 1 shows a cellular telephone housing.

A portable Cellular telephone housing is shown in FIG. 1, having a front face 15, a first side face 16 and a second side face 17. The front face 15 includes openings 18 behind which a loudspeaker 50, as shown in FIG. 5, is mounted and an opening 19 behind which a microphone is mounted, thereby allowing the front face of the telephone to be brought into operating proximity with the mouth and an ear of a user.

Buttons 20 are provided on the front face 15 of the telephone for entering alpha numeric data and for selecting particular operating functions. An LCD display 21 is also provided, arranged to display alpha numeric information, along with an indication of the operating mode of the device and other operating characteristics, such as signal strength and battery level etc.

A rocker switch 22 extends through a hole in side face 16, which is arranged to co-operate with an operator's thumb. The rocker switch 22 includes a rocker member which co-operates with two push button switches mounted to an internal circuit board, held within the housing shown in FIG. 1, thereby allowing parameters to be adjusted.

Figure 5:
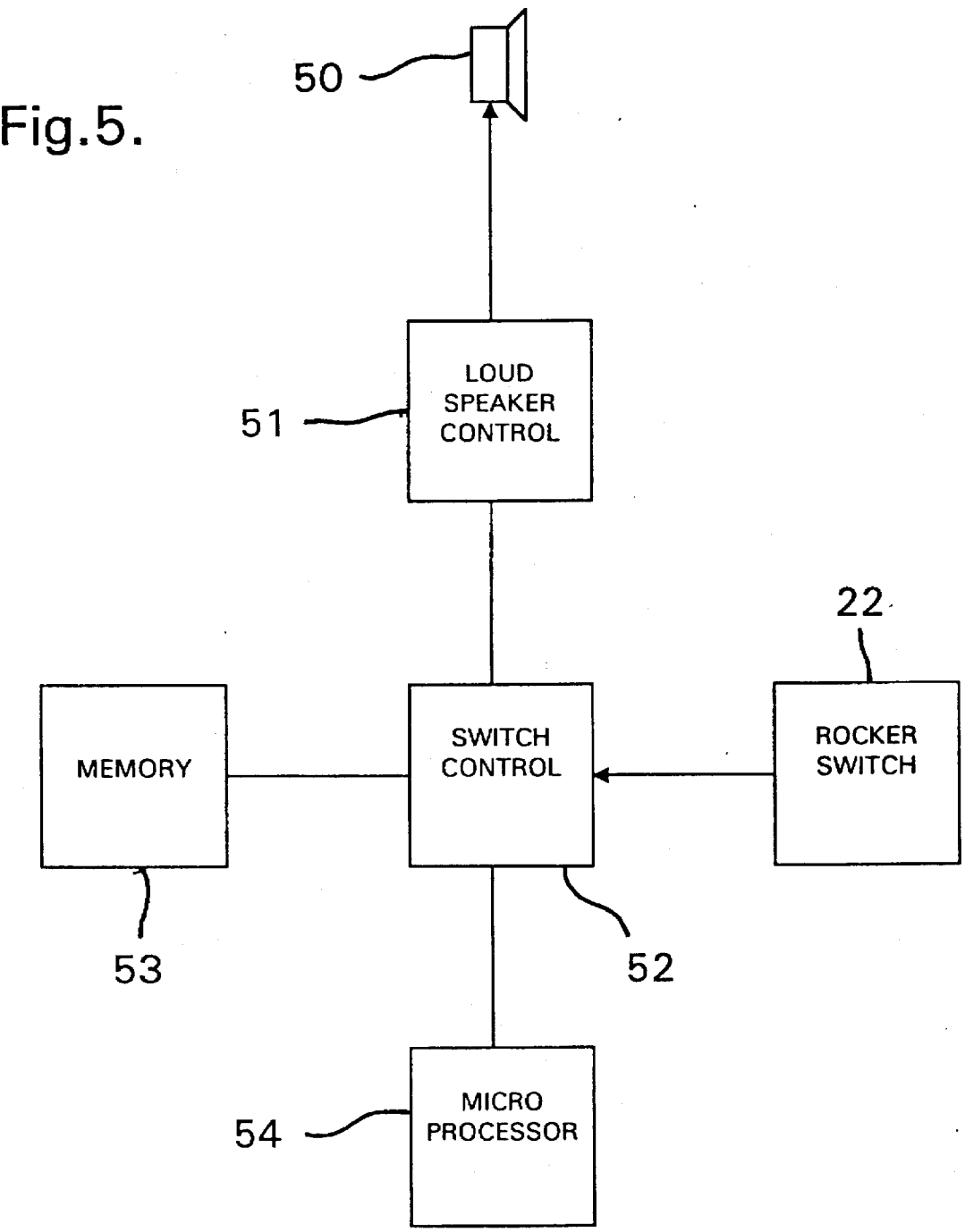
FIG. 5 shows a block diagram of a rocker switch and parameter controls for a telephone.

Referring also to FIG. 5, there is shown a rocker switch 22 connected to a switch control 52. A microprocessor 54 activates the switch control 52 to enable the rocker switch 22 to optionally control a parameter within a memory 53 or the amplitude of an output signal supplied to loudspeaker 50 via a loudspeaker control 51.

During telephone conversations, rocker switch 22 may be rocked in a first direction, so as to increase the amplitude of the output signal, or pushed in an opposite direction, so as to reduce the amplitude of the output signal. Similarly, when selecting a telephone number from internal memory 53, said rocker switch 22 may be used to scroll through stored telephone numbers. Thus, rocker switch 22 can be used to control any parameter which has a plurality of selectable options which can be considered in a logical sequence.

Figure 2:
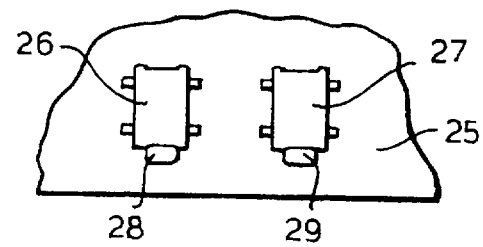
FIG. 2 shows a pair of push button switches mounted on a circuit board.

A circuit board is mounted within the housing shown in FIG. 1, so as to be parallel with front face 15. A portion of the circuit board 25 is shown in FIG. 2, having a first push button switch 26 and a second push button switch 27 mounted thereon. Push button switches 26 and 27 include resiliently mounted push buttons 28 and 29 respectively arranged such that said switches are closed when said buttons are pushed into their operating condition and such that said buttons return to their non-operating condition when pressure is removed therefrom.

As previously stated, arrangements are known in which a rocker switch, pivoted about side face 16 of the housing, co-operates with said push buttons. However, in such arrangements, it is necessary to ensure careful alignment between the circuit board 25 and the side face 16 of the housing.

Figure 3:
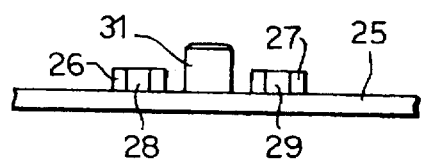
FIG. 3 shows a pivot mounted on a circuit board between two push button switches.
Figure 4:
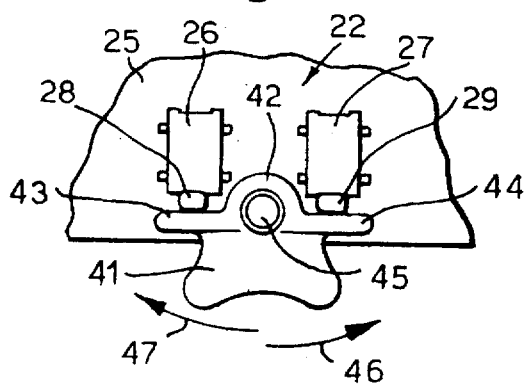
FIG. 4 shows the assembly of FIG. 3, having a rocker member located on the pivot and co-operating with the push button switches.

In the present embodiment, as shown in FIG. 3, a pivot 31 is mounted to the circuit board 25 during fabrication of the circuit board itself. As seen in FIG. 3, when the pivot 31 is fabricated with the board 25 it extends perpendicularly relative to a center plane of the board 25. As shown in FIG. 4, the rocker member 41 includes a hole 42 which engages with the pivot 31. As seen with FIGS. 3 and 4, when the rocker member 41 is mounted to the pivot 31, the rocker member 41 extends outward past a lateral side of the circuit board 25 generally parallel to a center plane of the circuit board. The rocker member 41 includes a first arm 43 which co-operates with button 28 and a second arm 44 which co-operates with button 29. A screw 45 secures the rocker member 41 to the pivot 31, further facilitating fabrication of the circuit board within the housing, without risk of the rocker member falling off the pivot.

After fabrication, rocker member 41 extends through a hole in the side face 16 of the housing. An operator's thumb is applied to the rocker switch and in response to pressure applied to said switch, said switch may rotate about pivot 31 in a first direction, indicated by arrow 46 and in a second direction indicated by arrow 47.

When the rocker member 41 is pushed in said first direction, arm 44 of the rocker member pushes button 29 into the body of switch 27 thereby activating the device. During normal operation of the telephone, while a conversation is taking place, activation of switch 27 results in the output volume from the loudspeaker 50, as shown in FIG. 5, being increased.

Similarly, an operator's thumb may cause rocker member 41 to be pushed in the direction of arrow 47, causing arm 43 to push button 28 into the housing of switch 26 and activating switch 26. During a normal telephone conversation, such an activation will cause the volume level from the loudspeaker 50, as shown in FIG. 5, to be reduced.

Thus, it can be appreciated that the positioning of the circuit board 25 relative to the housing is not critical, provided that the rocker member 41 extends through the hole in the side face 16 of the housing. Given that the pivot 31 is positioned during assembly of the circuit board, the rocker member 41 will always accurately align with push buttons 28 and 29.

What is claimed is:

1. A telephone handset comprising:

a housing;

a circuit board located in said housing;

a first switch mounted to said circuit board, said first switch including a first resiliently mounted push button arranged such that said first switch is in an operating condition when pressure is applied to said first push button and said first switch is in a non-operating condition when pressure is not applied to said first push button;

a second switch mounted to said circuit board, said second switch including a second resiliently mounted push button arranged such that said second switch is in an operating condition when pressure is applied to said second push button and said second switch is in a non-operating condition when pressure is not applied to said second push button;

a rocker member extending through a surface of said housing and attached to a pivot that is directly attached to said circuit board, whereby said rocker member is aligned to apply pressure to said first push button when manually pushed in a first direction and aligned to apply pressure to said second push button when manually pushed in a second direction;

a switch control electrically coupled to said first and second switches; and a microprocessor for activating said switch control to selectably control at least two different parameters.

2. A telephone handset according to claim 1, wherein said rocker member is securely mounted to said pivot by securing means.

3. A telephone handset according to claim 2, wherein said securing means is a rivet or a screw.

4. A telephone handset according to claim 1, wherein the operation of said first switch adjusts the controlled parameter in a first sense and the operation of said second switch adjusts said parameter in a second sense.

5. A telephone handset according to claim 4 further including a loudspeaker, wherein the controlled parameter is the amplitude of an output signal supplied to said loudspeaker.

6. A telephone handset according to claim 4 further including a memory for storing telephone numbers, wherein the controlled parameter identifies the address of specific telephone numbers within said memory.

7. A telephone handset according to claim 1 wherein one of said parameters is the telephone number displayed on a display.

8. A telephone handset comprising:

a housing having a front surface and side surfaces;

a circuit board located in said housing;

a first switch mounted to said circuit board, said first switch including a first resiliently mounted push button arranged such that said first switch is in an operating condition when pressure is applied to said first push button and said first switch is in a non-operating condition when pressure is not applied to said first push button;

a second switch mounted to said circuit board, said second switch including a second resiliently mounted push button arranged such that said second switch is in an operating condition when pressure is applied to said second push button and said second switch is in a non-operating condition when pressure is not applied to said second push button; and a rocker member extending through a first one of said side surfaces of said housing and attached to a pivot that is directly attached to said circuit board, whereby said rocker member is aligned to apply pressure to said first push button when manually pushed in a first direction and aligned to apply pressure to said second push button when manually pushed in a second direction.

9. A telephone handset according to claim 8, wherein said rocker member is securely mounted to said pivot by securing means.

10. A telephone handset according to claim 9, wherein said securing means is a rivet or a screw.

11. A telephone handset according to claim 8, wherein said switches are used to control a parameter and the operation of said first switch adjusts said parameter in a first sense and the operation of said second switch adjusts said parameter in a second sense.

12. A telephone handset according to claim 11, including a loudspeaker, wherein in said parameter is the amplitude of an output signal supplied to said loud speaker.

13. A telephone handset according to claim 8, wherein said switches are used to control a parameter, the handset further including a memory for storing telephone numbers, wherein said parameter identifies the address of specific telephone numbers within said memory.

14. A telephone handset according to claim 8 wherein said switches are used to control at least two different parameters.

15. A telephone handset according to claim 14 wherein one of said parameters is the amplitude of sound from a loudspeaker.

16. A telephone handset according to claim 8 wherein said pivot extends perpendicularly relative to a center plane of said circuit board.

17. A telephone handset according to claim 8 wherein said rocker member extends outward past a lateral side of said circuit board generally parallel to a center plane of said circuit board.

18. A method of assembling a telephone handset comprising steps of:

providing a printed circuit board with two switches and a pivot between the two switches;

pivotably mounting a rocker member directly onto the printed circuit board on the pivot;

connecting the printed circuit board to a housing of the handset; and locating the rocker member in an aperture in the housing such that a portion of the rocker member extends out of the housing, wherein the rocker member is located in front of the two switches such that a first one of the switches is mechanically actuated by the rocker member only when the rocker member is moved in a first direction and a second one of the switches is mechanically actuated by the rocker member only when the rocker member is moved in a second direction.

19. A method as in claim 18 further comprising attaching a fastener to the pivot to retain the rocker member on the pivot.

20. A method as in claim 18 wherein the step of pivotably mounting the rocker member comprises the rocker member extending past a lateral side of the printed circuit board in a direction parallel to a center plane of the printed circuit board.

21. A method as in claim 18 wherein the first and second switches each have a push button that are depressed by the rocker member when the rocker member is moved in the respective first and second directions.

22. In a portable telephone having a housing, a printed circuit board located inside the housing, switches connected to the printed circuit board, and a switch actuator located relative to the switches to actuate the switches, wherein the improvement comprises:

the switch actuator comprising a rocker member pivotably attached to a pivot directly on the circuit board, wherein a first one of the switches is mechanically actuated by the rocker member only when the rocker member is moved in a first direction and a second one of the switches is mechanically actuated by the rocker member only when the rocker member is moved in a second direction.

23. A telephone as in claim 22 wherein the pivot extends perpendicularly from the printed circuit board.

24. A telephone as in claim 22 wherein the rocker member extends outward past an edge of the printed circuit board parallel to a center plane of the printed circuit board.

25. A telephone as in claim 22 wherein the first and second switches each have a push button that are depressed by the rocker member when the rocker member is moved in the respective first and second directions.

* * * * *